United States Patent
Kalyanasundharam et al.

(10) Patent No.: US 11,210,246 B2
(45) Date of Patent: Dec. 28, 2021

(54) PROBE INTERRUPT DELIVERY

(71) Applicant: Advanced Micro Devices, Inc., Santa Clara, CA (US)

(72) Inventors: Vydhyanathan Kalyanasundharam, San Jose, CA (US); Eric Christopher Morton, Austin, TX (US); Bryan P. Broussard, Austin, TX (US); Paul James Moyer, Fort Collins, CO (US); William Louie Walker, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 12 days.

(21) Appl. No.: 16/112,367

(22) Filed: Aug. 24, 2018

(65) Prior Publication Data

US 2020/0065275 A1 Feb. 27, 2020

(51) Int. Cl.
*G06F 13/24* (2006.01)
*G06F 13/42* (2006.01)

(52) U.S. Cl.
CPC .......... *G06F 13/24* (2013.01); *G06F 13/4282* (2013.01); *G06F 2213/0026* (2013.01); *G06F 2213/0042* (2013.01)

(58) Field of Classification Search
CPC .............................. G06F 13/24; G06F 13/4282
USPC ........................................................ 710/260
See application file for complete search history.

(56) References Cited

U.S. PATENT DOCUMENTS

| | | | |
|---|---|---|---|
| 5,303,362 A | 4/1994 | Butts, Jr. et al. | |
| 5,412,788 A | 5/1995 | Collins et al. | |
| 5,517,494 A | 5/1996 | Green | |
| 5,537,575 A | 7/1996 | Foley et al. | |
| 5,560,038 A | 9/1996 | Haddock | |
| 5,659,708 A | 8/1997 | Arimilli et al. | |
| 5,673,413 A | 9/1997 | Deshpande et al. | |
| 5,684,977 A | 11/1997 | Van Loo et al. | |

(Continued)

OTHER PUBLICATIONS

International Search Report and Written Opinion in International Application No. PCT/US2019/039288, dated Oct. 4, 2019, 11 pages.

(Continued)

*Primary Examiner* — Chun Kuan Lee
(74) *Attorney, Agent, or Firm* — Kowert Hood Munyon Rankin and Goetzel PC; Rory D. Rankin

(57) ABSTRACT

Systems, apparatuses, and methods for routing interrupts on a coherency probe network are disclosed. A computing system includes a plurality of processing nodes, a coherency probe network, and one or more control units. The coherency probe network carries coherency probe messages between coherent agents. Interrupts that are detected by a control unit are converted into messages that are compatible with coherency probe messages and then routed to a target destination via the coherency probe network. Interrupts are generated with a first encoding while coherency probe messages have a second encoding. Cache subsystems determine whether a message received via the coherency probe network is an interrupt message or a coherency probe message based on an encoding embedded in the received message. Interrupt messages are routed to interrupt controller(s) while coherency probe messages are processed in accordance with a coherence probe action field embedded in the message.

17 Claims, 8 Drawing Sheets

(56) References Cited

U.S. PATENT DOCUMENTS

| | | |
|---|---|---|
| 5,749,095 A | 5/1998 | Hagersten |
| 5,859,983 A | 1/1999 | Heller et al. |
| 5,878,268 A | 3/1999 | Hagersten |
| 5,887,138 A | 3/1999 | Hagersten et al. |
| 5,893,144 A | 4/1999 | Wood et al. |
| 5,924,118 A | 7/1999 | Arimilli et al. |
| 5,966,729 A | 10/1999 | Phelps |
| 5,987,544 A | 11/1999 | Bannon et al. |
| 5,991,819 A | 11/1999 | Young |
| 6,012,127 A | 1/2000 | McDonald et al. |
| 6,018,791 A | 1/2000 | Arimilli et al. |
| 6,038,644 A | 3/2000 | Irie et al. |
| 6,049,851 A | 4/2000 | Bryg et al. |
| 6,070,231 A | 5/2000 | Ottinger |
| 6,085,263 A | 7/2000 | Sharma et al. |
| 6,098,115 A | 8/2000 | Eberhard et al. |
| 6,101,420 A | 8/2000 | VanDoren et al. |
| 6,108,737 A | 8/2000 | Sharma et al. |
| 6,108,752 A | 8/2000 | VanDoren et al. |
| 6,112,281 A | 8/2000 | Bamford et al. |
| 6,138,218 A | 10/2000 | Arimilli et al. |
| 6,199,153 B1 | 3/2001 | Razdan et al. |
| 6,209,065 B1 | 3/2001 | Van Doren et al. |
| 6,249,846 B1 | 6/2001 | Van Doren et al. |
| 6,275,905 B1 | 8/2001 | Keller et al. |
| 6,286,090 B1 | 9/2001 | Steely, Jr. et al. |
| 6,292,705 B1 | 9/2001 | Wang et al. |
| 6,295,573 B1 * | 9/2001 | Bailey .................... G06F 13/24 710/260 |
| 6,295,583 B1 | 9/2001 | Razdan et al. |
| 6,370,621 B1 | 4/2002 | Keller |
| 6,389,526 B1 * | 5/2002 | Keller .................... G06F 13/24 710/264 |
| 6,631,401 B1 | 10/2003 | Keller et al. |
| 10,019,390 B2 * | 7/2018 | Chitlur .................... G06F 13/24 |
| 2002/0083254 A1 * | 6/2002 | Hummel ................ G06F 13/24 710/261 |
| 2004/0148464 A1 * | 7/2004 | Jang ...................... G06F 9/3804 711/120 |
| 2006/0106982 A1 * | 5/2006 | Ashmore ............ G06F 11/2089 711/114 |
| 2008/0222389 A1 | 9/2008 | Bruce et al. |
| 2013/0080673 A1 | 3/2013 | Feehrer et al. |
| 2014/0156950 A1 | 6/2014 | Chew |
| 2016/0117247 A1 * | 4/2016 | Morton ............... G06F 12/0815 711/141 |

OTHER PUBLICATIONS

Kalyanasundharam et al., U.S. Appl. No. 16/112,367, entitled "Probe Interrupt Delivery", filed Aug. 24, 2018, 27 pages.

* cited by examiner

| Message Type 410 | Coherency Probe Action Field 415 | Address Field 420 | | | Response Field 425 |
|---|---|---|---|---|---|
| Coherency Probe Message 410A | Coherent Probe Action Indicator 415A | Address 420A | | | Response Indicator 425A |
| Interrupt Message 410B | Interrupt Delivery Indicator 415B | Interrupt Type Indicator 420B | | Target Indicator 420C | No Response Indicator 425B |
| ... | ... | ... | | ... | ... |

Table 400

FIG. 4

PROBE INTERRUPT DELIVERY

BACKGROUND

Description of the Related Art

In general, an interrupt or exception is an event that changes instruction execution from a currently executing instruction flow to another instruction flow. An interrupt is typically generated by a processor or a device coupled to the processor. A typical interrupt processing mechanism changes program control flow of the interrupted processor to an interrupt handler. Input/output (I/O) device and central processing unit (CPU) to CPU interrupts generally need to be delivered to any CPU thread in a computing system based on the programming of an interrupt controller or the type of interrupt being delivered. Historically, delivering interrupts to a core often used sideband wires. Sideband wires are dedicated, per-core wires to deliver the interrupt type and the interrupt vector to each core. However, the sideband wires become difficult to scale as the number of cores increases, leading to a very large number of wires dedicated to interrupt delivery.

BRIEF DESCRIPTION OF THE DRAWINGS

The advantages of the methods and mechanisms described herein may be better understood by referring to the following description in conjunction with the accompanying drawings, in which:

FIG. 4 illustrates examples of coherency probe messages and interrupt messages in accordance with various implementations.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for routing interrupts on a coherency probe network are disclosed herein. In one implementation, a computing system includes at least a plurality of processing nodes, a coherency probe network, and one or more control units. The coherency probe network carries coherency probe messages between coherent agents. Interrupts that are detected by a control unit are converted into messages that are compatible with coherency probe messages and then routed to a target destination via the coherency probe network. Interrupts are generated with a first encoding while coherency probe messages have a second encoding. Cache subsystems determine whether a message received via the coherency probe network is an interrupt message or a coherency probe message based on an encoding embedded in the received message. Interrupt messages are routed to interrupt controller(s) while coherency probe messages are processed in accordance with a coherence probe action field embedded in the message.

Figure 1:
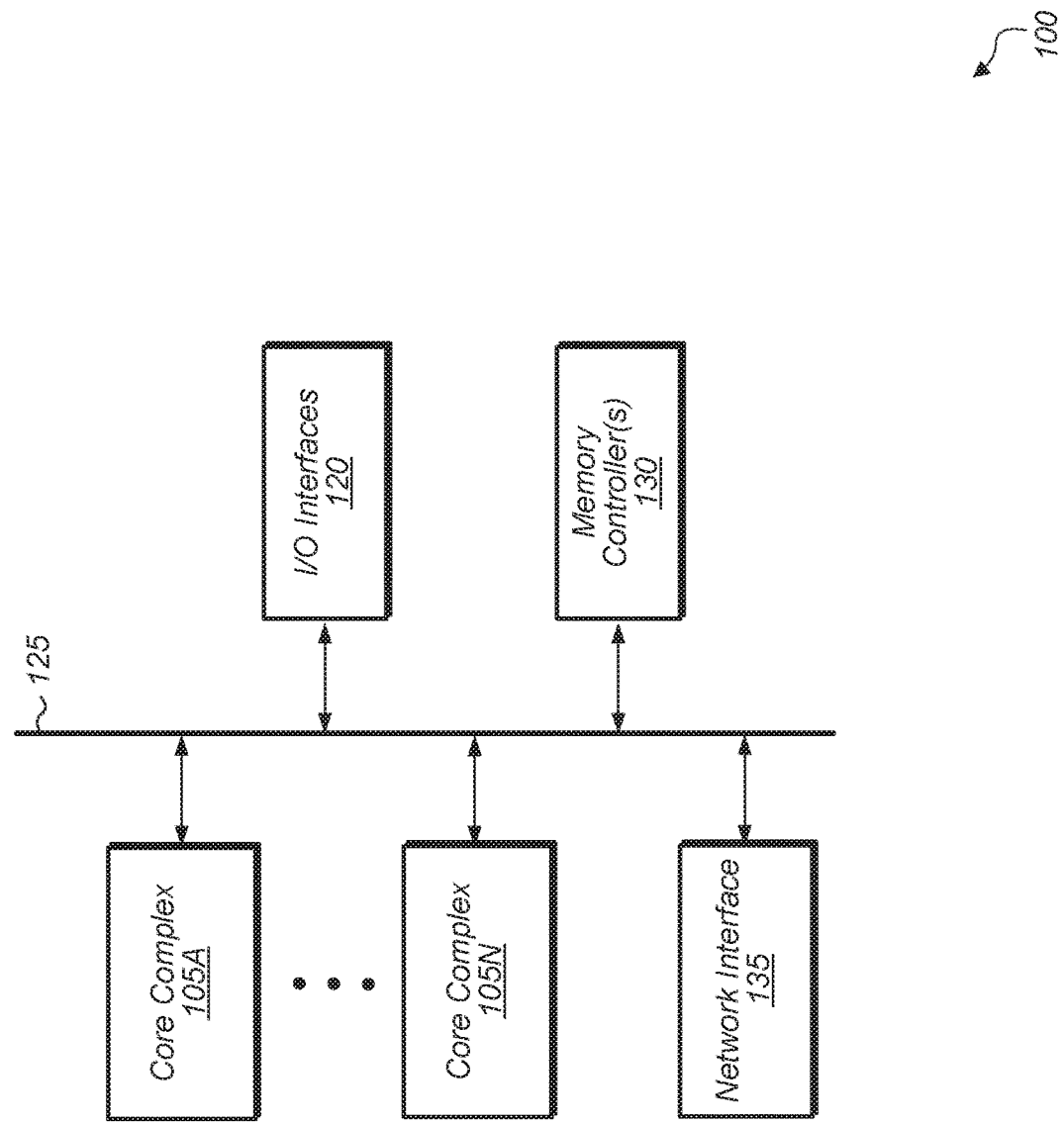
FIG. 1 is a block diagram of one implementation of a computing system.

Referring now to FIG. 1, a block diagram of one implementation of a computing system 100 is shown. In one implementation, computing system 100 includes at least core complexes 105A-N, input/output (I/O) interfaces 120, bus 125, memory controller(s) 130, and network interface 135. In other implementations, computing system 100 includes other components and/or computing system 100 is arranged differently. In one implementation, each core complex 105A-N includes one or more general purpose processors, such as central processing units (CPUs). It is noted that a "core complex" is also referred to as a "processing node" or a "CPU" herein. In some implementations, one or more core complexes 105A-N include a data parallel processor with a highly parallel architecture. Examples of data parallel processors include graphics processing units (GPUs), digital signal processors (DSPs), and so forth. In various implementations, each processor core within core complex 105A-N includes an interrupt controller and a cache subsystem with one or more levels of caches. In one implementation, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
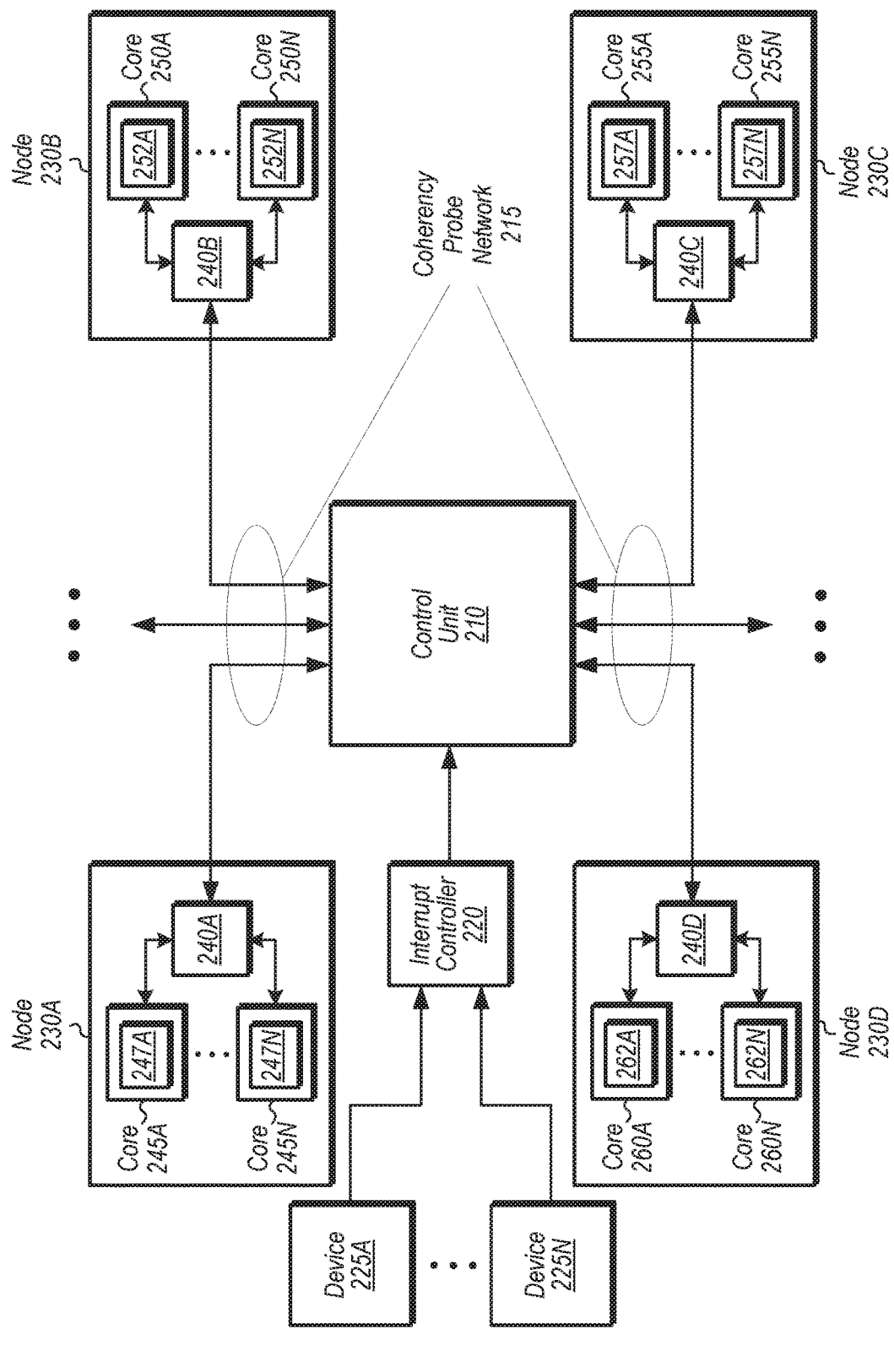
FIG. 2 is a block diagram of another implementation of a computing system.

Turning now to FIG. 2, a block diagram of another implementation of a computing system 200 is shown. In one implementation, system 200 includes control unit 210, coherency probe network 215, interrupt controller 220, devices 225A-N, and nodes 230A-D. In one implementation, control unit 210 is located within a coherence unit. In other implementations, control unit 210 is part of any of various other types of components. Alternatively, in a further implementation, control unit 210 is a standalone component. Devices 225A-N are representative of any number and type of peripheral or input/output (I/O) devices connected to control unit 210 via interrupt controller 220.

In one implementation, system 200 is a system on chip (SoC). In other implementations, system 200 is any of various other types of computing systems. Nodes 230A-D are representative of any number and type of processing nodes. Each node 230A-D includes any number of processor cores 245A-N, 250A-N, 255A-N, and 260A-N, respectively. Although four nodes 230A-D are shown in system 200 in FIG. 2, this is shown merely for illustrative purposes. It should be understood that the number of nodes included in system 200 varies from implementation to implementation. In other implementations, system 200 includes other components and/or is organized in other suitable manners.

In one implementation, system 200 enforces a memory coherency protocol to ensure that a processor core or device does not concurrently access data that is being modified by another core or device. To comply with the memory coherency protocol, the cores and devices of system 200 transmit coherency messages (e.g., coherency probe message and probe responses) over coherency probe network 215. Accordingly, coherency probe network 215 is designed to carry coherency probe message and probe responses between coherent agents of system 200. A coherency probe message is a message that seeks the coherency state of data associated with a particular memory location. A probe response is typically sent back to the coherent agent that generated the coherency probe message. A probe response indicates the coherency state of the referenced data, transfers data in response to a probe, or provides other information in response to a probe. Typically, a coherency probe network 215 only carries coherency probe messages and probe responses. However, in system 200, coherency probe network 215 also carries interrupts targeting one or more of cores 230A-D. This allows the interrupts to benefit from using a dedicated, low-latency network that spans multiple components within system 200 and is scalable to an arbitrary number of threads.

In various implementations, each device 225A-N is able to generate an interrupt by asserting an interrupt signal which is detected by interrupt controller 220. In response to detecting the interrupt signal, interrupt controller 220 generates an interrupt message with information such as destination identifier, delivery mode, interrupt vector, or other suitable information. Interrupt controller 220 then conveys the interrupt message to control unit 210. In one implementation, control unit 210 converts the interrupt message into a coherency probe message with a special encoding, and then control unit 210 conveys the specially encoded coherency probe message on coherency probe network 215 to one or more targets.

To facilitate the transfer of interrupts on coherency probe network 215, control unit 210 includes logic for generating, receiving, processing, and forwarding interrupts. This logic also handles the normal processing of coherency probe messages. In one implementation, when control unit 210 detects or receives an interrupt, control unit 210 generates an interrupt message that is compatible with the format of a coherency probe message. Generating the interrupt message in a compatible format allows coherency probe network 215 to carry the interrupt message in a similar fashion to a coherency probe message. While the interrupt message is compatible with a coherency probe message, the interrupt message includes embedded encodings which allow other components to distinguish the interrupt message from a coherency probe message. After generating an interrupt message in a coherency-compatible format, control unit 210 conveys the interrupt message on coherency probe network 215 to one or more nodes 230A-D targeted by the interrupt. In one implementation, control unit 210 broadcasts the interrupt message on coherency probe network 215 to all nodes 230A-D. In another implementation, control unit 210 sends the interrupt message on coherency probe network 215 only to the node(s) targeted by the interrupt message.

In one implementation, coherency probe network 215 is connected to a cache subsystem 240A-D in each node 230A-D, respectively. Each cache subsystem 240A-D includes any number of cache levels. For example, in one implementation, each cache subsystem 240A-D includes a level three (L3) cache and a level two (L2) cache. In this implementation, each core includes a local level one (L1) cache. In other implementations, each cache subsystem 240A-D includes other cache levels. When a given cache subsystem 240A-D receives a message via coherency probe network 215, the given cache subsystem 240A-D determines whether the message is an interrupt message or a coherency probe message. If the message is an interrupt message, the given cache subsystem 240A-D sends the interrupt message to the interrupt controller(s) within the corresponding core(s). As shown in system 200, nodes 230A-D include interrupt controllers 247A-N, 252A-N, 257A-N, and/or 262A-N within cores 245A-N, 250A-N, 255A-N, and/or 260A-N, respectively. In one implementation, in response to receiving an interrupt message, a given cache subsystem 240A-D broadcasts the interrupt message to all of the cores in the corresponding node. In another implementation, in response to receiving an interrupt message, a given cache subsystem 240A-D sends the interrupt message only to those cores targeted by the interrupt message. The interrupt controller(s) in the core(s) will examine the interrupt message and generate interrupts to send to the targeted core(s).

Figure 3:
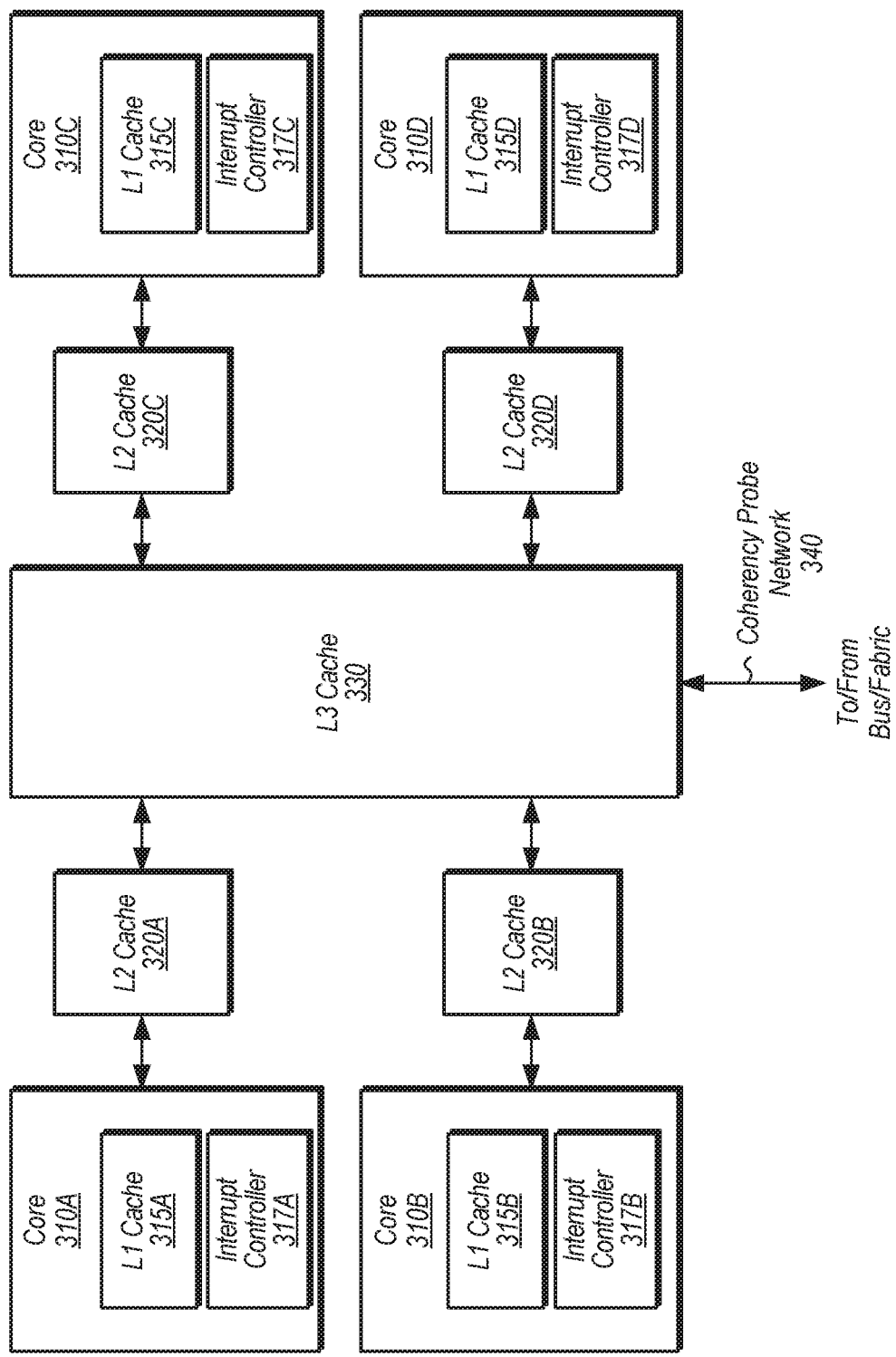
FIG. 3 is a block diagram of one implementation of a core complex.

Referring now to FIG. 3, a block diagram of one implementation of a core complex 300 is shown. In one implementation, core complex 300 includes four processor cores 310A-D. In other implementations, core complex 300 includes other numbers of processor cores. It is noted that a "core complex" can also be referred to as a "processing node", "node", or "CPU" herein. In one implementation, the components of core complex 300 are included within core complexes 105A-N (of FIG. 1).

Each processor core 310A-D includes a cache subsystem for storing data and instructions retrieved from the memory subsystem (not shown). For example, in one implementation, each core 310A-D includes a corresponding level one (L1) cache 315A-D. Each processor core 310A-D also includes or is coupled to a corresponding level two (L2) cache 320A-D. Additionally, in one implementation, core complex 300 includes a level three (L3) cache 330 which is shared by the processor cores 310A-D. It is noted that in other implementations, core complex 300 can include other types of cache subsystems with other numbers of caches and/or with other configurations of the different cache levels.

L3 cache 330 is coupled to a bus/fabric via coherency probe network 340. L3 cache 330 receives both coherency probes and interrupt messages via coherency probe network 340. L3 cache 330 forwards coherency probes and interrupt messages to L2 caches 320A-D. In one implementation, L3 cache 330 broadcasts received coherency probes and interrupt messages to all L2 caches 320A-D. In another implementation, L3 cache 330 forwards a received coherency probe or interrupt message to only those L2 caches 320A-D targeted by the probe or interrupt message. In this implementation, L3 cache 330 includes logic to examine coherency probes and interrupt messages to determine their targets. Upon receiving messages from L3 cache 330, L2 caches 320A-D examine the messages to determine whether the messages are interrupts or coherency probes. The L2 caches 320A-D forward interrupt messages for processing to interrupt controllers 317A-D, respectively. The L2 caches 320A-D process coherency probes according to their embedded coherency probe action fields.

Turning now to FIG. 4, examples of encoding coherency probe messages and interrupt messages in a hybrid message format are shown. Table 400 illustrates examples of the types of messages that can be sent using a hybrid message format. The leftmost column of table 400 indicates the message type 410, with two different types of messages shown in table 400: coherency probe message 410A and interrupt message 410B. In other implementations, other numbers of different types of messages are encoded in the hybrid message format. Using a hybrid message format allows interrupt message 410B to be formatted in a similar manner to coherency probe message 410A. Accordingly, the fields, or in some cases combinations of fields, of interrupt message 410B are aligned to match the fields of coherency probe message 410A. The hybrid message format includes any number of fields, with the number of fields varying from implementation to implementation. As shown in table 400, the hybrid message format includes a coherency probe action field 415, address field 420, response field 425, and any number of other fields.

The first entry of table 400 shows an example of a coherency probe message 410A. For coherency probe message 410A, field 415 is encoded with a coherency probe action indicator 415A. The coherency probe action indicator 415A can be set equal to any of various different values depending on the probe action type. For interrupt message 410B, field 415 is encoded with interrupt delivery indicator 415B to indicate that the message is an interrupt. In one implementation, control logic in a cache subsystem (e.g., cache subsystem 240A of FIG. 2) looks at field 415 to determine if a received message is a coherency probe message or an interrupt message.

Field 420 specifies the address of a corresponding memory location being targeted by coherency probe message 415A. For interrupt message 410B, field 420 stores interrupt type indicator 420B in a first subset of bits and field 420 stores target indicator 420C in a second subset of bits. In other words, address field 420 is repurposed to hold both the interrupt type indicator 420B and the target indicator 420C of interrupt message 410B. This is possible since the combination of interrupt type indicator 420B and target indicator 420C is the same size as address field 420A. Interrupt type indicator 420B stores the type of interrupt that is being conveyed by interrupt message 410B and target field 420C specifies the target of interrupt message 410B.

Field 425 specifies the type of response that should be generated after processing the message. For coherency probe message 410A, field 425 is encoded with any of various response indicator 425A values specifying the type of response to send back to the source. For interrupt message 410B, response field 425 is encoded with a no response indicator 425B to indicate that no response needs to be sent back to the source. In other implementations, the hybrid message format includes other fields. For example, in another implementation, the hybrid message format includes an interrupt vector field to store the memory location of an interrupt handler. Other types of fields are possible and are contemplated for the hybrid message format.

Figure 5:
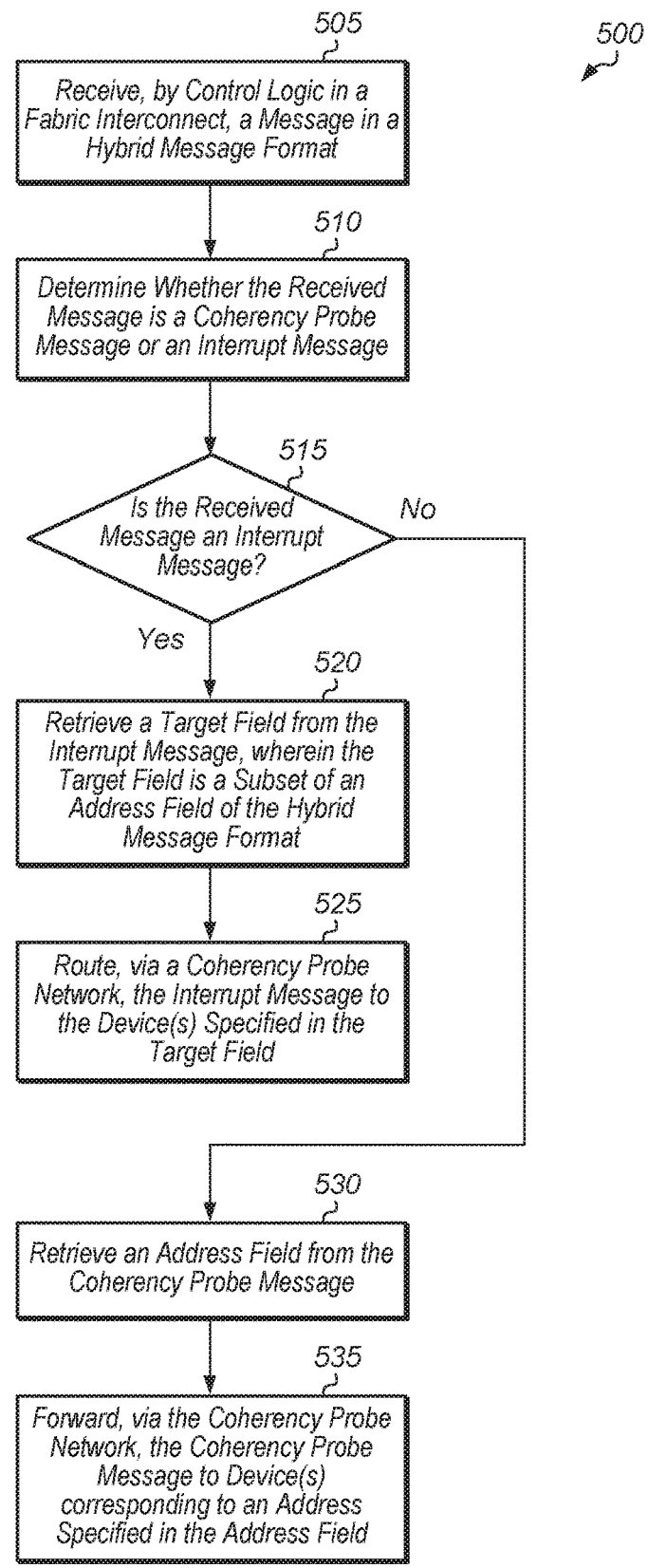
FIG. 5 is a generalized flow diagram illustrating one implementation of a method for generating messages to send over a coherency probe network.
Figure 6:
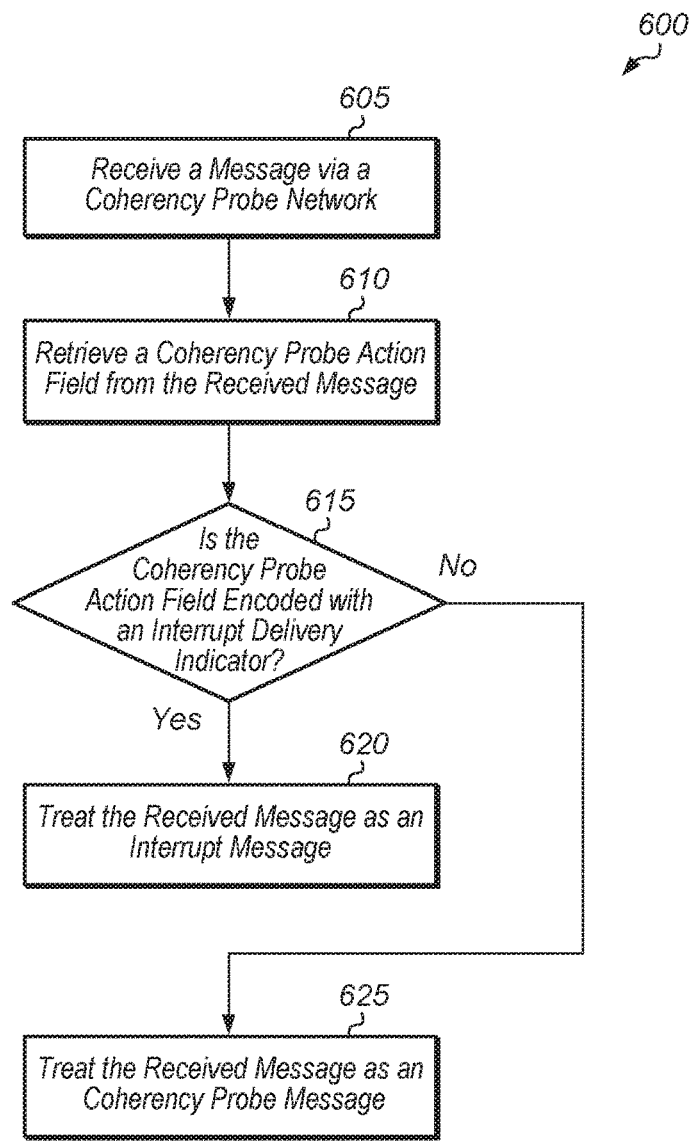
FIG. 6 is a generalized flow diagram illustrating one implementation of a method for determining whether a message is a coherency probe message or an interrupt message.
Figure 7:
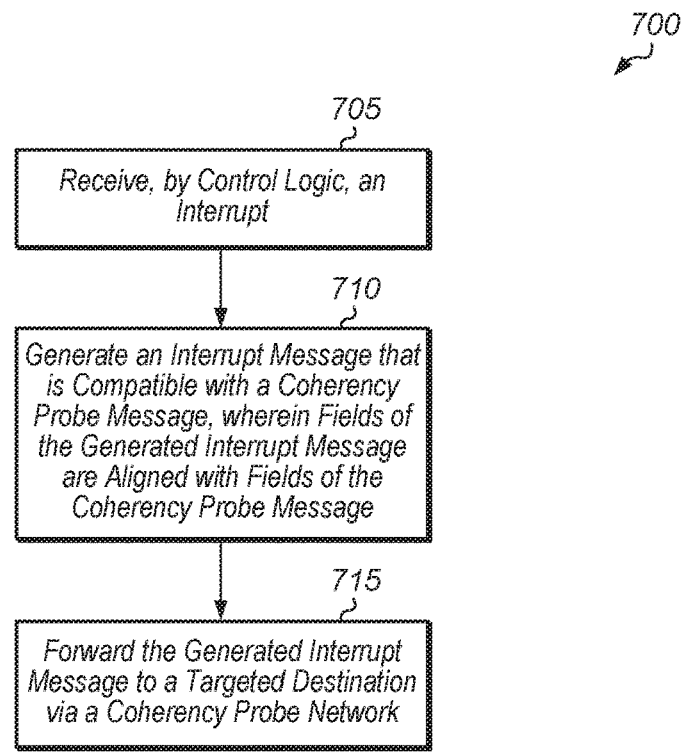
FIG. 7 is a generalized flow diagram illustrating one implementation of a method for generating an interrupt message.
Figure 8:
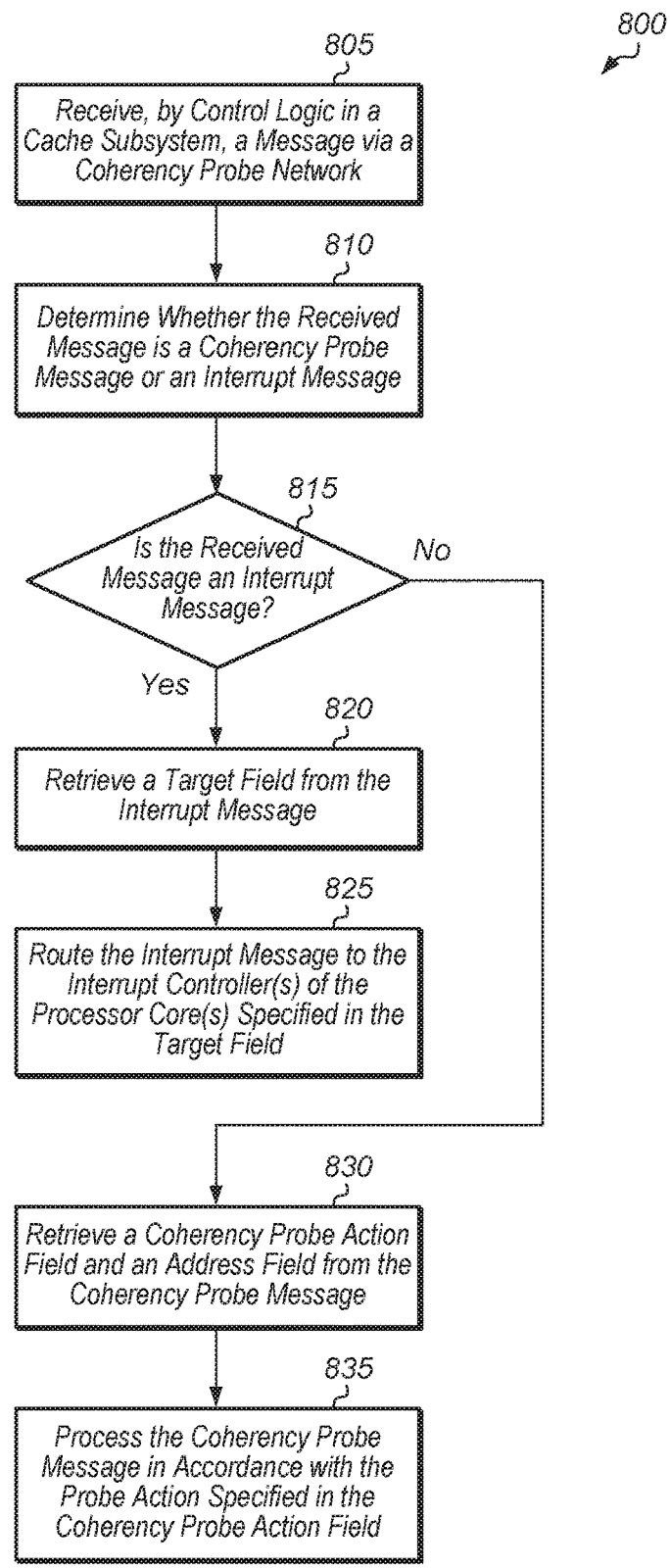
FIG. 8 is a generalized flow diagram illustrating one implementation of a method for processing a received message at a cache subsystem.

Referring now to FIG. 5, one implementation of a method 500 for generating messages to send over a coherency probe network is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

Control logic in a fabric interconnect receives a message in a hybrid message format (block 505). In response to receiving the message in the hybrid message format, the control logic determines whether the message is a coherency probe message or an interrupt message (block 510). One example of how to determine whether a message is a coherency probe message or an interrupt message is described in the discussion regarding method 600 of FIG. 6. If the received message is an interrupt message (conditional block 515, "yes" leg), then the control logic retrieves a target field from the interrupt message, wherein the target field is a subset of an address field of the hybrid message format (block 520). In other words, if the address field is Y bits long, then the target field is X bits long, wherein X is less than Y, and wherein X and Y are both positive integers. An example of a target field being a subset of an address field is shown in table 400 of FIG. 4. Next, the control unit routes, via a coherency probe network, the interrupt message to the device(s) specified in the target field (block 525). If the received message is a coherency probe message (conditional block 515, "no" leg), then the control logic retrieves an address field from the coherency probe message (block 530). Next, the control logic forwards, via a coherency probe network, the coherency probe message to the device(s) corresponding to an address specified in the address field (block 535). After blocks 525 and 535, method 500 ends.

Turning now to FIG. 6, one implementation of a method for determining whether a message is a coherency probe message or an interrupt message is shown. Control logic receives a message via a coherency probe network (block 605). In response to receiving the message, the control logic retrieves a coherency probe action field from the received message (block 610). If the coherency probe action field is encoded with an interrupt delivery indicator (conditional block 615, "yes" leg), then the control logic treats the received message as an interrupt message (block 620). If the coherency probe action field is encoded with a coherency probe action indicator (conditional block 615, "no" leg), then the control logic treats the received message as a coherency probe message (block 625). In other words, if the coherency probe action field of the message is encoded with any value other than the interrupt delivery indicator, then the control logic treats the received message as a coherency probe message. After blocks 620 and 625, method 600 ends.

Referring now to FIG. 7, one implementation of a method 700 for generating an interrupt message is shown. Control logic receives an interrupt (block 705). Depending on the implementation, the control logic is located in a cache subsystem, coherence point, or other location within a computing system. In response to receiving the interrupt, the control logic generates an interrupt message that is compatible with a coherency probe message, wherein fields of the generated interrupt message are aligned with fields of the coherency probe message (block 710). Then, the control logic forwards the interrupt message to a targeted destination via a coherency probe network (block 715). After block 715, method 700 ends.

Turning now to FIG. 8, one implementation of a method 800 for processing a received message at a cache subsystem is shown. Control logic in a cache subsystem receives a message via a coherency probe network (block 805). In one implementation, the control logic is part of a L2 cache. In other implementations, the control logic is located at other levels of the cache subsystem. In response to receiving the message, the control logic determines whether the message is a coherency probe message or an interrupt message (block 810). One example of how to determine whether the message is a coherency probe message or an interrupt message is described in method 600 of FIG. 6.

If the message is an interrupt message (conditional block 815, "yes" leg), then the control logic retrieves a target field from the message (block 820). Then the control logic routes the interrupt message to the interrupt controller(s) of the processor core(s) targeted by the interrupt (block 825). Alternatively, in another implementation, the control logic broadcasts the interrupt message to the interrupt controllers of all processor cores in the node. If the message is a coherency probe message (conditional block 815, "no" leg), then the control logic retrieves a coherency probe action field and an address field from the message (block 830). Next, the control logic processes the coherency probe message in accordance with the probe action specified in the coherency probe action field (block 835). After blocks 825 and 835, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more processing nodes, each comprising one or more processor cores and a cache subsystem, wherein each cache subsystem is configured to determine whether a received message is a coherency probe message or an interrupt message based on an embedded encoding;
a control unit; and
a coherency probe network configured to convey coherency probe messages and interrupt messages from the control unit to one or more of the cache subsystems of the one or more processing nodes;
wherein the control unit is configured to:
generate an interrupt message in a hybrid message format that is compatible with a format of a coherency probe message used by the coherency probe network, responsive to detecting an interrupt; and
send, via the coherency probe network, the interrupt message on a path to a cache subsystem of a target processing node of the one or more processing nodes before a processor core is notified of the interrupt.

2. The system as recited in claim 1, wherein the control unit is further configured to:
generate a first encoding for coherency probe messages;
embed the first encoding in a given field of coherency probe messages sent on the coherency probe network;
generate a second encoding for interrupt messages, wherein the second encoding is different from the first encoding; and
embed the second encoding in the given field of interrupt messages sent on the coherency probe network.

3. The system as recited in claim 1, wherein the interrupt message includes an encoding in a response field that indicates no response needs to be sent.

4. The system as recited in claim 1, wherein each cache subsystem is further configured to broadcast an interrupt message to the one or more processor cores of a respective node responsive to determining that the received message is an interrupt message.

5. The system as recited in claim 1, wherein fields of the interrupt message are aligned to match fields of the coherency probe message.

6. The system as recited in claim 1, wherein the control unit is further configured to encode a coherency probe action field of the interrupt message with an interrupt delivery indicator.

7. A method comprising:
conveying, by a coherency probe network, coherency probe messages and interrupt messages from a control unit to one or more cache subsystems of one or more processing nodes;
generating, by the control unit, an interrupt message in a hybrid message format that is compatible with a format of coherency probe messages used by the coherency probe network, responsive to detecting an interrupt; and
sending, by the control unit via the coherency probe network, the interrupt message to a cache subsystem of a target processing node of the one or more processing nodes before a processor core is notified of the interrupt;

determining, by the cache subsystem, whether a received message is a coherency probe message or an interrupt message based on an embedded encoding.

8. The method as recited in claim 7, further comprising:
generating a first encoding for coherency probe messages;
embedding the first encoding in a given field of coherency probe messages sent on the coherency probe network;
generating a second encoding for interrupt messages, wherein the second encoding is different from the first encoding; and
embedding the second encoding in the given field of interrupt messages sent on the coherency probe network.

9. The method as recited in claim 7, wherein the interrupt message includes an encoding in a response field that indicates no response needs to be sent.

10. The method as recited in claim 7, further comprising broadcasting, by the cache subsystem, an interrupt message to a plurality of processor cores of a respective node responsive to determining that the message is an interrupt message.

11. The method as recited in claim 7, wherein fields of the interrupt message are aligned to match fields of the coherency probe message.

12. The method as recited in claim 7, further comprising encoding a coherency probe action field of the interrupt message with an interrupt delivery indicator.

13. An apparatus comprising:
a plurality of processor cores; and
a cache subsystem;
wherein the apparatus is configured to:
generate an interrupt message in a hybrid message format that is compatible with a format of a coherency probe message used by a coherency probe network, responsive to detecting an interrupt; and
send, via the coherency probe network, the interrupt message on a path to a cache subsystem of a target agent before a processor core is notified of the interrupt, wherein the coherency probe network is configured to carry coherency probe messages and interrupt messages to one or more cache subsystems of the apparatus and one or more coherent agents;
wherein the cache subsystem is configured to determine whether a received message is a coherency probe message or an interrupt message based on an embedded encoding.

14. The apparatus as recited in claim 13, wherein the apparatus is further configured to:
generate a first encoding for coherency probe messages;
embed the first encoding in a given field of coherency probe messages sent on the coherency probe network;
generate a second encoding for interrupt messages, wherein the second encoding is different from the first encoding; and
embed the second encoding in the given field of interrupt messages sent on the coherency probe network.

15. The apparatus as recited in claim 13, wherein the interrupt message includes an encoding in a response field that indicates no response needs to be sent.

16. The apparatus as recited in claim 13, wherein the cache subsystem of the apparatus is further configured to broadcast an interrupt message to a plurality of processor cores of a respective coherent agent responsive to determining that the received message is an interrupt message.

17. The apparatus as recited in claim 13, wherein fields of the interrupt message are aligned to match fields of the coherency probe message.

* * * * *